United States Patent [19]  [11] Patent Number: 4,626,443
Takahashi et al.  [45] Date of Patent: Dec. 2, 1986

[54] PROCESS FOR PREPARING DRESSINGS COMPRISING W/O/W TYPE MULTIPLE EMULSIONS

[75] Inventors: Yasuyuki Takahashi; Shigeru Aizawa; Shigeru Tamai; Toshiro Yoshida; Takeshi Takahashi, all of Tokyo, Japan

[73] Assignee: Meiji Milk Products Company Limited, Tokyo, Japan

[21] Appl. No.: 770,180

[22] Filed: Aug. 28, 1985

Related U.S. Application Data

[63] Continuation-in-part of Ser. No. 610,853, May 16, 1984, abandoned.

[51] Int. Cl.$^4$ .............................................. A23L 1/24
[52] U.S. Cl. .................................... 426/602; 426/607; 426/589; 426/613; 426/804
[58] Field of Search ............... 426/602, 607, 589, 613, 426/804

[56] References Cited

U.S. PATENT DOCUMENTS

| | | | |
|---|---|---|---|
| 2,125,391 | 8/1938 | Musher | 426/602 |
| 2,575,874 | 11/1951 | Herlow | 426/602 |
| 3,615,702 | 10/1971 | Swisher | 426/602 |
| 3,729,325 | 4/1973 | Howard et al. | 426/602 |
| 3,840,682 | 10/1974 | Kubota | 426/602 |
| 3,906,116 | 9/1975 | Quesnel | 426/602 |

FOREIGN PATENT DOCUMENTS

| | | | |
|---|---|---|---|
| WO84/01270 | 4/1984 | PCT Int'l Appl. | 426/602 |
| 1349404 | 4/1974 | United Kingdom | 426/602 |

*Primary Examiner*—Jeanette Hunter
*Attorney, Agent, or Firm*—Browdy and Neimark

[57] ABSTRACT

The present invention relates to a process for preparing dressings comprising W/O/W type multiple emulsions. A W/O/W type emulsion can be obtained by phase inversion from W/O type emulsion by adding an aqueous phase to an oil phase containing monoerucin, dierucin, or polyglycerol polycondensed ricinoleic acid ester as the emulsifier under agitating. Also, dressings having an excellent richness can be provided.

2 Claims, 1 Drawing Figure

PROCESS FOR PREPARING DRESSINGS COMPRISING W/O/W TYPE MULTIPLE EMULSIONS

The present application is a continuation-in-part of the Ser. No. 610,853, filed May 16, 1984, now abandoned.

FIELD OF THE INVENTION

The present invention relates to dressings having an excellent richness.

More particularly, the invention relates to a process for preparing dressings comprising W/O/W type multiple emulsions such as mayonnaises.

BACKGROUND OF THE INVENTION

Generally, the use of W/O/W type multiple emulsions in the production of various cosmetics, medicines and foods have been expected, since they have a fine texture and a quite smooth touch, a water-soluble substance can be encapsulated in the fat globules in the emulsions and an apparent fat ratio can be increased.

SUMMARY OF THE INVENTION

The present invention relates to a process for preparing dressings comprising a stable W/O/W typ multiple emulsion and having excellent palatability and richness. The invention can also be used as technology to reduce fat and calorie.

The term "dressings" herein involves broadly salad dressings, mayonnaises, French dressings and dips.

DETAILED DESCRIPTION OF THE INVENTION

Figure 1:
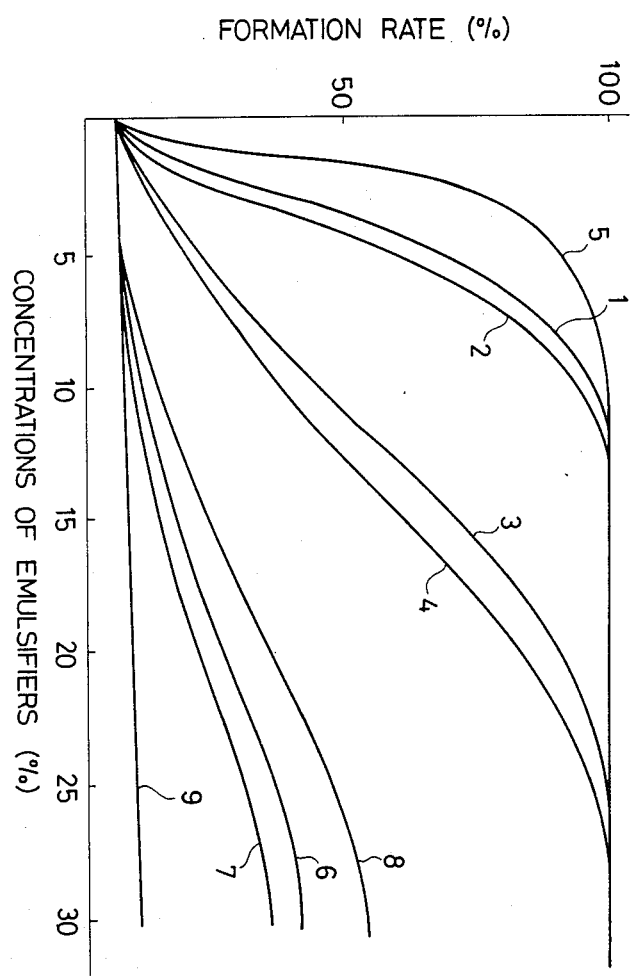
FIG. 1 shows W/O/W type multiple emulsion-forming rates with various concentrations of emulsifiers determined in Test 1.

The emulsifiers used in the present invention include one or more of monoerucin, dierucin and polyglycerol polycondensed ricinoleic acid ester (i.e., polyglycerol polyricinoleate or polyglycerol ester of polycondensed fatty acid of castor oil).

The polyglycerol polycondensed ricinoleic acid ester is represented by the following formula (I).

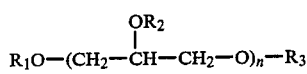

wherein n is 2 to 12, and $R_1$, $R_2$, and $R_3$ each represents a hydrogen or condensed ricinoleic acid represented by the following formula (II), provided that at least one of $R_1$, $R_2$, and $R_3$ represents the polycondensed ricinoleic acid of the formula (II).

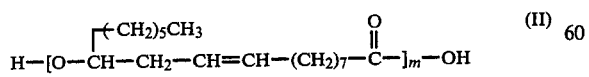

wherein m is 2 to 10.

In the present invention, those properly selected from the polyglycerol polycondensed ricinoleic acid esters represented by the above general formula are used alone or in the form of a mixture of two or more of them.

In the process of the present invention, the emulsifier in an amount of 0.1 to 15%, preferably 1.0 to 10%, particularly 1 to 6%, based on an oil is added to the oil to obtain a mixture. The oil may be any one. In using a hardened oil, it is melted by heating before the use. If necessary, lecithin and/or glycerol difatty acid ester may be added thereto in an amount of about 0.5 to 30% based on the emulsifier.

The aqueous phase of the present invention is prepared as follows: an additive or a mixture of additives are added to water. The additives include, for example, casein, sodium caseinate, gelatin, wheat protein, starch, modified starch, soybean protein, plasma protein, whey protein, albumen, yolk, dextrin, cyclodextrin, starch derivatives, locust bean gum, xanthane gum, pullulan, dextran, curdlan, guar gum, tamarind gum, agar carrageenan, furcellaran, alginic acid and salts thereof, propylene glycol alginate, pectin, arabinogalactan, crystalline cellulose, CMC, methylcellulose, acacia, tragacanth gum, karaya gum and sodium polyacrylates; as well as orthophosphoric acid, pyrophosphoric acid, polyphosphoric acid and salts of them, common salt, vinegar, organic acids and salts thereof, and emulsifiers. The emulsifier herein used may be any hydrophilic emulsifier. Further, a colorant, seasoning, etc. may be added thereto according to the purpose. The aqueous phase is preferably heated to about 50° to 80° C. so as to facilitate the subsequent emulsification.

The order of the addition in mixing the oil phase to the aqueous phase is not limited. For convenience's sake in the operation, the oil phase is first charged in an agitator, and then the aqueous phase is successively added thereto under agitating. The mixture is preferably agitated, for example, by means of T.K. Homo Mixer at about 6000 rpm. by the continuous agitating, the W/O type emulsion once formed is gradually subjected to a phase inversion to form a W/O/W type emulsion.

The mixing ratio of oil phase to aqueous phase is preferably in the range of about 3/1 to 1/3.

The thus obtained W/O/W emulsion is a quite fine emulsion.

Thus, according to the present invention, a stable W/O/W emulsion containing extremely fine water droplets can be obtained. By using this emulsion, rich mayonnaises, dressings, French dressings and dips can be prepared.

The following tests and examples will further illustrate the present invention.

Test 1

The following emulsifier was added to 300 g of hardened soybean oil heated to 75° C. in an amount of 1 to 30% (varied) based on the oil, and the mixture was stirred to obtain each oil phase.
 1. monoerucin,
 2. dierucin,
 3. monolinolein,
 4. dilinolein,
 5. tetraglycerol condensed hexaricinoleic acid ester,
 6. glycerol monooleate,
 7. glycerol dioleate,
 8. sorbitan monooleate,
 9. glycerol monostearate.

Separately, 50 g of egg yolk and 5 g of sodium caseinate were added to 700 g of water. The mixture was heated to 75° C. to prepare an aqueous phase.

The aqueous phase was added to each oil phase under agitating in T.K. Homo Mixer at 6000 rpm to effect the phase inversion from W/O emulsion to W/O/W emulsion. The obtained W/O/W emulsion was treated in a homogenizer at a rate of 40 kg/cm$^2$ and cooled to 5° C.

The W/O/W formation rate of each of the thus obtained W/O/W emulsions was examined to obtain the results shown in FIG. 1. The numerals 1 to 9 stand for the above-mentioned emulsifiers.

It is apparent from FIG. 1 that the emulsifiers 1, 2, and 5 were particularly effective in obtaining the W/O/W emulsions.

The W/O/W formation rate was determined according to a method of Matsumoto et al. described in "Yukagaku" 26 (10), 655 (1977).

Test 2

Dressings containing various oleophilic emulsifiers shown in Table 1 were prepared in the same manner as in Example 1 and the physical properties thereof were compared with one another.

The results of the comparison are shown in Table 1.

TABLE 1

| Emulsifier | Concentration (% based on oil) | Formation rate | Richness | Taste | Smoothness of texture | Stability after 1 week | 2 week | 1 month |
|---|---|---|---|---|---|---|---|---|
| Tetraglycerol polycondensed hexaricinoleic acid ester | 4 | O | O | O | O | O | O | O |
| Monoerucin | 4 | O | O | O | O | O | O | O |
| Monolinolein | 4 | O | O | O | O | O | O | O |
| Monoolein | 10 | Δ | Δ | O | O | Δ | Δ | × |
| Diglycerol dioleate | 10 | Δ | Δ | O | O | Δ | Δ | × |
| Sorbitan monooleate | 10 | Δ | Δ | × | O | Δ | Δ | × |
| Glycerol monostearate | 10 | × | × | × | × | × | × | × |
| Monoerucin | 2 | O | O | O | O | O | O | O |
| Sorbitan monooleate | 2 | | | | | | | |
| Tetraglycerol polycondensed hexaricinoleic acid ester | 2 | O | O | O | O | O | O | O |
| Glycerol monooleate | 2 | | | | | | | |
| Monoerucin | 2 | O | O | O | O | O | O | O |
| Diglycerol dioleate | 2 | | | | | | | |

O: good,
Δ: slightly bad;
×: bad

Test 3

As the emulsifier, polyglycerol polycondensed ricinoleic acid esters having various polymerization degrees of glycerol and condensation degrees of ricinoleic acid each was added to 300 g of hardened soybean oil heated to 75° C. in an amount of 1% based on the oil, and the mixture was stirred to obtain an oil phase.

Separately, 500 g of water containing 1% of sodium caseinate and 2% of sorbitan monostearate was heated to 70° C., and the mixture was added to the above oil phase under agitating in an agitator at 250 rmp for 5 min, then treated in a homogenizer at a rate of 100 kg/cm$^2$, and cooled to 5° C.

The W/O/W formation rate of each of the thus obtained W/O/W emulsions was examined to obtain the results shown in Table 2.

The W/O/W formation rate was determined according to the method described in Test 1.

TABLE 2

| Polymerization degree of glycerol (n) | Condensation degree of ricinoleic acid (m) | | | | |
|---|---|---|---|---|---|
| | 2 | 3 | 4 | 5 | 6 |
| 2 | 70% | 72% | 72% | 74% | 75% |
| 3 | 75 | 76 | 76 | 77 | 78 |

TABLE 2-continued

| Polymerization degree of glycerol (n) | Condensation degree of ricinoleic acid (m) | | | | |
|---|---|---|---|---|---|
| | 2 | 3 | 4 | 5 | 6 |
| 4 | 87 | 93 | 95 | 95 | 94 |
| 5 | 85 | 90 | 94 | 95 | 94 |
| 6 | 88 | 89 | 93 | 95 | 94 |

Each numeral value indicates the W/O/W formation rate (%).

In Table 2, n and m mean the same as those of Formula (I) and Formula (II).

Test 4

The test was carried out in the same manner as in Test 3, except using mono- or polyglycerol ricinoleic acid ester in an amount of 1% based on the oil instead of polyglycerol condensed ricinoleic acid ester in Test 3.

The W/O/W formation rate of each of the thus obtained W/O/W emulsions was examined to obtain the results shown in Table 3.

The W/O/W formation rate was determined according to the method described in Test 1.

TABLE 3

| Polymerization degree of glycerol | Esterification degree of ricinoleic acid (number of molecule) | | | |
|---|---|---|---|---|
| | 1 | 2 | 3 | 6 |
| 1 | 17% | 19% | 0% | —% |
| 2 | 20 | 18 | 12 | — |
| 3 | 23 | 28 | 25 | — |
| 6 | 20 | 28 | 35 | 43 |
| 10 | 18 | 27 | 35 | 42 |

Each numeral value indicates the W/O/W formation rate (%).

It is apparent from Table 3 that each ricinoleic acid ester which is not condensed has a quite low formation rate.

EXAMPLE 1

1000 g of brewed vinegar was added to 3000 g of water. Then, 700 g of corn starch, 200 g of sugar and 90 g of common salt were added to the mixture. The resulting mixture was gelatinized by heating under stirring in a heating tank and then sterilized by heating to 150° C. for 30 sec. 1200 g of egg yolk, 65 g of mustard and other seasonings and spices were added thereto and stirred to prepare an aqueous phase.

Separately, 40 g of monoerucin and 4 g of lecithin were added to 2000 g of soybean salad oil heated to 50° C. The mixture was stirred to prepare an oil phase.

The above-mentioned aqueous phase was successively added to the oil phase under agitating in T.K. Homo Mixer at 6000 rpm. A W/O emulsion was formed while the addition amount of the aqueous phase was small, but, according to the increase in the amount of the aqueous phase, the W/O emulsion was subjected to a phase inversion to obtain a dressing comprising a W/O/W emulsion.

The resulting dressing could be stored stably for a quite long time even at ambient temperature. As compared with an O/W dressing having substantially the same oil content, the dressing obtained as above had an excellent richness.

EXAMPLE 2

1550 g of egg yolk, 250 g of sugar, 130 g of common salt and 100 g of mustard were added to 970 g of brewed vinegar. The mixture was stirred to prepare 3000 g of an aqueous phase.

The aqueous phase was added to an oil phase prepared in the same manner as in Example 1 under agitating by means of an agitator to effect the phase inversion from W/O emulsion into W/O/W emulsion. The W/O/W emulsion was homogenized by means of a colloid mill to obtain a W/O/W emulsion-type mayonnaise.

The W/O/W emulsion-type mayonnaise obtained as above could be stored stably for a quite long time even at ambient temperature.

As compared with an O/W mayonnaise having the same oil content, the product had an excellent richness.

EXAMPLE 3

40 g of dierucin was used instead of 40 g of monoerucin in Example 1.

The thus obtained dressing could be stored stably for a quite long time even at ambient temperature. As compared with an O/W dressing having the same oil content, the dressing obtained as above had an excellent richness.

EXAMPLE 4

40 g of dierucin was used instead of 40 g of monoerucin in Example 2.

The thus obtained W/O/W emulsion-type mayonnaise could be stored stably for a quite long time even at ambient temperature.

As compred with an O/W mayonnaise having the same oil content, the product had an excellent richness.

EXAMPLE 5

40 g of tetraglycerol polycondensed hexaricinoleic acid ester was used instead of 40 g of monoerucin in Example 1.

The thus obtained dressing could be stored stably for a quite long time even at ambient temperature. As compared with an O/W dressing having the same oil content, the dressing obtained as above had an excellent richness.

EXAMPLE 6

40 g of tetraglycerol polycondensed hexaricinoleic acid ester was used instead of 40 g of monoerucin in Example 2.

The thus obtained W/O/W emulsion-type mayonnaise could be stored stably for a quite long time even at ambient temperature.

As compared with an O/W mayonnaise having the same oil content, the product had an excellent richness.

What is claimed is:

1. A process for preparation of dressings comprising W/O/W type multiple emulsions which comprises adding an emulsifier selected from the group consisting of monoerucin, dierucin, and polyglycerol polycondensed recinoleic acid ester to an oil in an amount of 0.1 to 15% based on said oil, adding said oil, containing said emulsifier, to an inner aqueous phase in a ratio of 3/1 to 1/3 to obtain an O/W type emulsion, phase-inverting the emulsion by additional agitating to obtain a W/O type emulsion, adding vinegar to water in an amount effective to season a dressing to form an outer aqueous phase, adding the W/O type emulsion to an amount of said outer aqueous phase effective to obtain a dressing, and agitating the mixture to obtain said dressing.

2. A process for preparing dressings according to claim 1 wherein the aqueous phase comprises water containing one or more of casein, sodium caseinate, gelatin, wheat protein, soybean protein, plasma protein, whey protein, egg white, egg yolk, starch, modified starch, dextrin, cyclodextrin, starch derivatives, locust gean gum, xanthane gum, pullulan, dextran, curdlan, guar gum, tamarind gum, agar, carrageenan, furcellaran, alginic acid and salts thereof, propylene glycol alginate, pectin, arabinogalactan, crystalline cellulose, CMC, methylcellulose, acacia, tragacanth gum, karaya gum, sodium polyacrylate, pyrophosphoric acid, polyphosphoric acid and salts thereof, common salt, vinegar, sugar, organic acids and salts thereof, emulsifiers, colorants and seasonings.

* * * * *

UNITED STATES PATENT AND TRADEMARK OFFICE
CERTIFICATE OF CORRECTION

PATENT NO. : 4,626,443

DATED : December 2, 1986

INVENTOR(S) : Yasuyuki Takahashi et al.

It is certified that error appears in the above-identified patent and that said Letters Patent is hereby corrected as shown below:

The term of this patent subsequent to May 20, 2003 has been disclaimed.

Signed and Sealed this

Thirty-first Day of March, 1987

Attest:

DONALD J. QUIGG

*Attesting Officer*  *Commissioner of Patents and Trademarks*